US008027346B1

(12) United States Patent
Venables et al.

(10) Patent No.: US 8,027,346 B1
(45) Date of Patent: Sep. 27, 2011

(54) METHOD AND SYSTEM FOR SCHEDULER DOMINATED MERGE OF STATE CHANGES

(75) Inventors: Bradley D. Venables, Ottawa (CA); David G. Stuart, Almonte (CA)

(73) Assignee: Avaya Inc., Basking Ridge, NJ (US)

( * ) Notice: Subject to any disclaimer, the term of this patent is extended or adjusted under 35 U.S.C. 154(b) by 268 days.

(21) Appl. No.: 12/128,874

(22) Filed: May 29, 2008

(51) Int. Cl.
*H04L 12/28* (2006.01)
*H04L 12/56* (2006.01)

(52) U.S. Cl. ........ 370/394; 370/230; 370/231; 370/235; 370/236; 370/336; 370/412; 370/413; 370/414; 370/415; 370/416; 370/417; 370/418; 370/419; 709/238; 710/244

(58) Field of Classification Search .............. 370/336, 370/394, 230, 231, 235, 236; 710/244
See application file for complete search history.

(56) References Cited

U.S. PATENT DOCUMENTS

| | | | |
|---|---|---|---|
| 7,372,857 B1 * | 5/2008 | Kappler et al. ............ | 370/395.4 |
| 7,646,779 B2 * | 1/2010 | Kumar et al. ............. | 370/408 |
| 7,653,069 B2 * | 1/2010 | Lakshmanamurthy et al. ........................ | 370/395.4 |
| 7,760,747 B2 * | 7/2010 | Dally et al. ................ | 370/412 |
| 2007/0253375 A1 * | 11/2007 | Hamilton et al. ........... | 370/336 |
| 2009/0043934 A1 * | 2/2009 | Bjerregaard ............... | 710/244 |

* cited by examiner

*Primary Examiner* — Hassan Phillips
*Assistant Examiner* — Lonnie Sweet
(74) *Attorney, Agent, or Firm* — Christopher & Weisberg, P.A.

(57) ABSTRACT

A method and system schedule data for dequeuing in a communication network. The communication network includes an eligible scheduling node, a scheduling context structure, and an existence of data structure. In response to determining that an eligible scheduling node does not contain at least one child identifier in the scheduling context structure, an eligible child is selected for dequeue from the existence of data structure. At least one eligible child from the existence of data structure is absorbed into the scheduling context structure. The at least one eligible child includes the child selected for dequeue. Absorbing a child includes removing the child identifier from the existence of data queue and adding the child identifier to the scheduling context structure.

17 Claims, 7 Drawing Sheets

METHOD AND SYSTEM FOR SCHEDULER DOMINATED MERGE OF STATE CHANGES

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to communication network scheduling, and more specifically to a method and system for allowing a scheduler to control the order of processing updates arriving from other intervening processes.

BACKGROUND OF THE INVENTION

Every computer and communication network which transfers data packets must implement some form of scheduling to insure that data traffic progresses through the network at a particular rate. At any given moment, a network may have hundreds of thousands or even millions of connections containing data queues waiting for transport through the network. Some form of scheduling is required to enable network elements to process these data queues in a fair and efficient manner.

In a perfect implementation of a scheduler system, all scheduler states would be perfectly synchronized for accuracy through a multi-level scheduling hierarchy. The scheduler would instantaneously absorb bursty high bandwidth enqueues of data and changes of state injected by intervening scheduling processes. In this perfect implementation, any decision the scheduler makes would be a fair, e.g., correct, decision. However, in more typical implementations, some of the scheduler states can be out-of-date due to other intervening processes, leading to occasional academically incorrect, e.g., unfair, decisions.

A hierarchical scheduler having a computational complexity of O(1), using commonly known "big-O" notation, allows a relatively small number of data structure updates per scheduling level, per scheduling decision, e.g., typically enough to satisfy a scheduling event and a modest average enqueue rate per scheduling level. However, the scheduler may be processing hundreds of thousands (even millions) of scheduler nodes in the hierarchy. The processing order for scheduling should flow down the scheduling hierarchy and the processing order for enqueues should ideally flow up through the same hierarchy; but other processes in the system can simultaneously interact, or interfere with the scheduler state. For example, an enqueue process can generate multiple enqueue events per scheduler decision. A multicast enqueue implementation can generate multiple enqueue events per scheduler decision with a potentially bursty distribution. Additionally, an orthogonal scheduler, such as rate-based scheduling, can generate bursts of state changes to many scheduler nodes and queues per scheduler decision.

Sometimes non-O(1) algorithms are preferred due to ease of implementation, but to maintain accuracy, it could be necessary to run them at a relatively high update rate, thereby increasing processing requirements. Findings of the non O(1) algorithms may need to be merged into a primary O(1) scheduler state, which also could represent an assist or an interference. In this environment, it is very difficult for the O(1) scheduler to maintain dominance over these other intervening or interfering tasks when the other may be actually be capable of changing state more rapidly than the O(1) scheduler itself.

For example, consider a scheduler with a simple round robin scheduler implemented as a scheduling control queue ("SCQ") containing children which are currently scheduling. The scheduler transmits from the child indicated by the head element of the SCQ and then moves the head element of the SCQ to the tail of the SCQ. If there is more than one child in the SCQ the next scheduler decision will pick a different child based on the new head element in the SCQ. In a stable system with data always available, all children of the scheduler are in the SCQ and they each take their turn scheduling in a round robin transmission pattern. However, if many children of the scheduler are not eligible to transmit or have no data to transmit, they will not be present in the SCQ.

At some point, a burst of children not in the SCQ could become eligible for scheduling. The traditional solutions include designing a scheduler system which can accommodate the maximum burst rate of state changes and absorb the children into the scheduler as their state changes or queuing the burst of children with new state outside the scheduler (the queue is invisible to the scheduler) and absorbing new children into the scheduler state as quickly as possible.

The traditional implementation of designing a scheduler system which can accommodate these bursts of child state changes and absorb children into the scheduler is very difficult to implement in very complex, multi-level scheduling systems because the scheduling system tends to have a large amount of state changes per scheduler instance. Consider a scheduler with 4 levels of scheduling, such that the Level 1 ("L1") scheduler chooses one of 100 Level 2 ("L2") schedulers, the selected Level 2 scheduler chooses one of its 1000 Level 3 ("L3") schedulers, and the selected Level 3 scheduler chooses one of 8 queues to transmit data from. Because there are 100 Level 2 and 100,000 Level 3 schedulers in this system, the system is usually designed as a single circuit per scheduling level with two of the 100,100 contexts loaded into the circuits to make a decision. If the physical scheduler circuits are complex, the absorption of child state can be very difficult because it may require that a Level 3 context be loaded into the scheduler, a corresponding L2 context be loaded and then the L3/L2/L1 state being updated. This must happen in the gaps between when the scheduler is loading context to making transmission decisions.

Therefore, what is needed is a method and system for allowing a primary scheduler to control the order of importance of updates arriving from intervening processes when making scheduling decisions.

SUMMARY OF THE INVENTION

The present invention advantageously provides a method and system for scheduling data for dequeuing in a communication network. In one embodiment of the present invention, the communication network includes at least one eligible scheduling node, a scheduling context structure and an existence of data structure.

In accordance with one aspect, the present invention provides a method for scheduling data for dequeuing in a communication network. The communication network includes an eligible scheduling node, a scheduling context structure, and an existence of data structure. In response to determining that an eligible scheduling node does not contain at least one child identifier in the scheduling context structure, an eligible child is selected for dequeue from the existence of data structure and absorbed into the scheduling context structure. Absorbing includes removing the child identifier for the at least one eligible child from the existence of data structure and adding the child identifier to the scheduling context structure.

In accordance with another aspect, the present invention provides another method for scheduling data for dequeuing in a communication network. A child node or data queue is determined to be eligible for dequeuing and an eligibility state for the child node or data queue is set to eligible. If an existence of data structure of a parent scheduling node for the child node or data queue is not empty, an identifier for the child node or data queue is added to the existence of data structure.

In accordance with yet another aspect, the present invention provides a system for scheduling data for dequeuing in a communication network. The system includes at least one data queue containing data for dequeuing, at least one child, which may be a data queue or a child node, at least one parent scheduling node, and an eligibility updater. The at least one child is communicatively coupled to the at least one data queue and the at least one parent scheduling node. The parent scheduling node includes a scheduling context structure and an existence of data structure. The eligibility updater is communicatively coupled to the at least one data queue, the at least one child, and the at least one parent scheduling node. The eligibility updater is operable to determine an eligibility state for a child and upon determining that the child is eligible, the eligibility updater sets an eligibility state for the child to eligible. If the existence of data structure of the parent scheduling node is not empty, the eligibility updater appends an identifier for the child to the existence of data structure.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
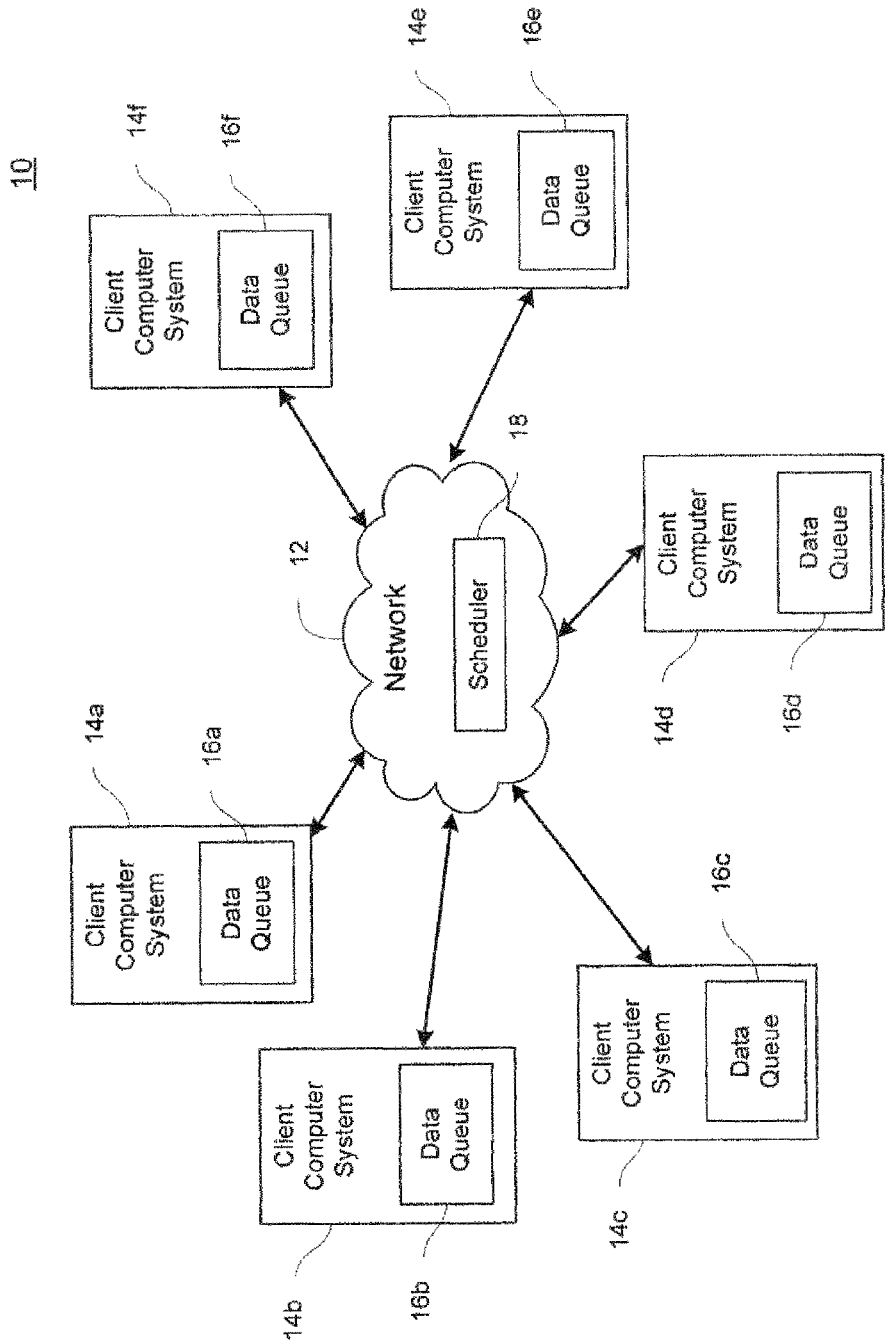
FIG. 1 is a block diagram of an exemplary data communication system constructed in accordance with the principles of the present invention.

Before describing in detail exemplary embodiments that are in accordance with the present invention, it should be observed that the embodiments reside primarily in combinations of apparatus components and processing steps related to implementing a system and method for allowing a primary O(1) scheduler to control the order of importance of updates arriving from intervening processes in a computer or other communication network to facilitate scheduling. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. A "root" node refers to the highest level node in a weighted fair queuing tree, or the highest node in a branch of a hierarchical weighted fair queuing tree. A "descendant" of a particular node is any node at a level below the node in question whose lineage may be traced back to the node in question. Similarly an "ancestor" of a particular node is any node at a level above the node in question whose lineage may be traced to the node in question. The terms "child," "child node" or "children" refer to any direct descendants of a node in a scheduling tree. Generally, when discussing a relationship to a particular node, the term "child" refers to a node (scheduler node or queue) one level below the node in question. Additionally, any node descending from a node having a higher level may be referred to as a "child node" or "child."

One embodiment of the present invention advantageously provides a method and system for scheduling data packet transmission in a data communication system by allowing a primary scheduler to control the order of importance of updates arriving from intervening processes. One embodiment of the present invention implements an Existence of Data ("EoD") structure. In a typical embodiment the EoD structure is a single queue per scheduler that can be read by the scheduler when making scheduling decisions. In other implementations, the EoD structure could be a set of queues or lists which allow sorting the children by urgency or importance. The EoD structure for a scheduler represents a group of children who have data to send and are eligible to send it but are not currently present in the scheduler's context structure. The scheduler's context structure is the set of queues or lists which the scheduler uses to sort eligible children in order to provide fair dequeuing opportunities to the children. Each entry in the EoD structure can be called a "child identifier" where the primary purpose of a child identifier is to name the eligible child or point to the eligible child, but the identifier could also contain other state information, such as the current eligibility state. Knowledge that children with eligible data existence for a scheduling node, e.g., through backlogged EoD queues, is added to the scheduler state of each node of the scheduling hierarchy. In making decisions, the scheduler can select a child for dequeuing from the "existence of data" ("EoD") queue similarly to selecting a child actually present in the scheduler context structure. Thus, the scheduler can make scheduling decisions without having to be capable of absorbing children into the scheduler context structure as quickly as children may change eligibility state due to intervening processes, where intervening processes of the most interest are those which can make a burst of children eligible in a short period of time such as a rate shaper or multicast enqueue process.

By adhering to the principles of the present invention, the scheduler is able to make good decisions dictated by the rates and/or weights configured in the scheduler, allowing out-of-date children to enter the scheduler context structures of parent scheduler nodes most frequently selected and compete for child selection with up-to-date children. The best fairness is achieved once all out-of-date children are absorbed into the scheduler context structures and therefore become up-to-date. If the scheduler is allowed to select branches of the hierarchy containing only out-of-date state but showing importance based on rates and/or weights, the scheduler is able to absorb some of the out-of-date states along the selected hierarchy making future decisions along that branch more fair. With more up-to-date state on the selected branch, the scheduler will know with increasing clarity, with each update to the out-of-date state, whether additional selections along this branch of the scheduling hierarchy are warranted. Because the scheduler dictates the urgency for which an out-of-date state should be absorbed into the scheduler context based on the scheduler configured rates and/or weights, the scheduler itself schedules the absorption of the out-of-date state.

Referring now to the drawing figures in which like reference designators refer to like elements, there is shown in FIG. 1, a data communication system constructed in accordance with the principles of the present invention and designated generally as "10." System 10 includes a wide-area network 12 such as the Internet, intranet, or other communication network, including but not limited to a personal area networks ("PAN"), local area networks ("LAN"), campus area networks ("CAN"), metropolitan area networks ("MAN"), etc. The wide-area network 12 may be connected to a plurality of client computer systems (six shown) 14a, 14b, 14c, 14d, 14e, 14f referred to collectively as computer system 14. Each computer system 14 may include a single client computer, multiple client computers connected together to form a smaller network, or multiple smaller network systems. Each client computer system 14 provides a data packet queue (six shown) 16a, 16b, 16c, 16d, 16e, 16f referenced collectively as 16. A scheduler 18 constructed in accordance with the principles of the present invention determines when and how many data packets from each data queue 16 are routed through the network 12. The scheduler 18 may be implemented as a portion of a router, switch, gateway, hub, or other interface device, or may be implemented as a stand-alone device or as part of a computer monitoring system 14. Additionally, each client computer system 14 may include its own scheduler(s) for determining when and what data enters and exits its own data queue 16. In other words, the scheduler 18 of the present invention can be implemented as a logical process in any network element that has data queues to process. As such, the arrangement in FIG. 1 is merely exemplary and is included solely to aid understanding of the invention.

Figure 2:
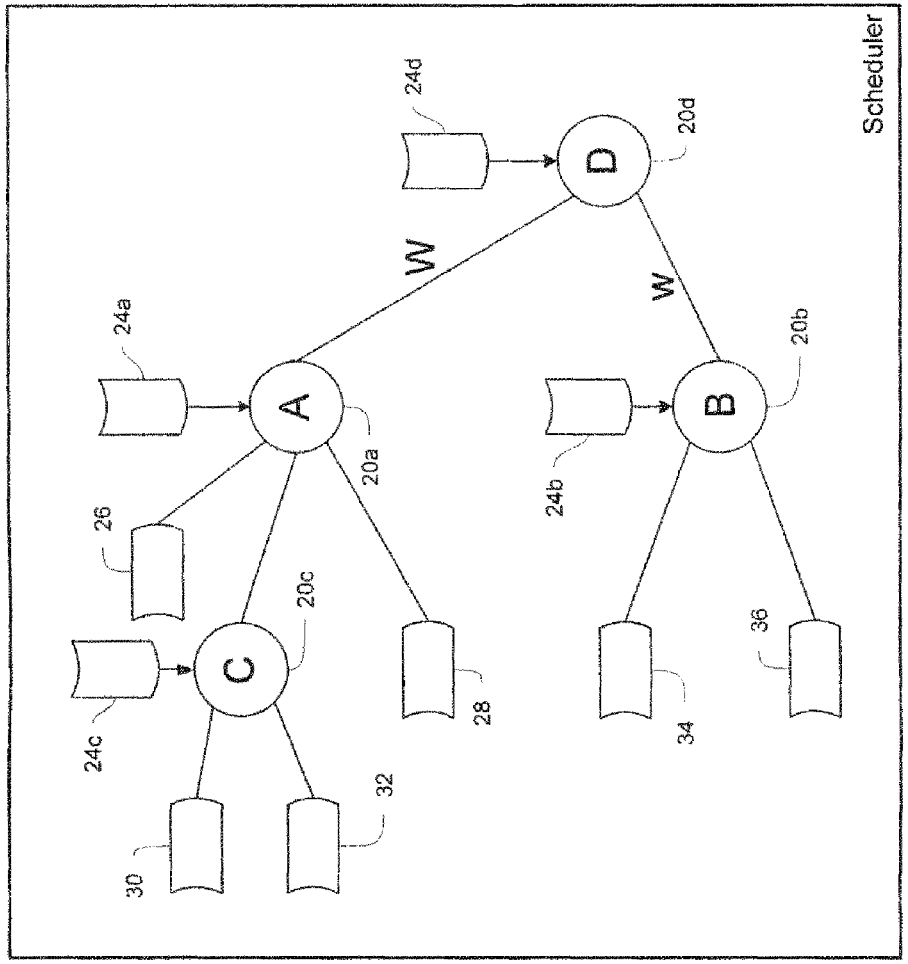
FIG. 2 is a block diagram of an exemplary scheduler constructed in accordance with the principles of the present invention.
Figure 2:
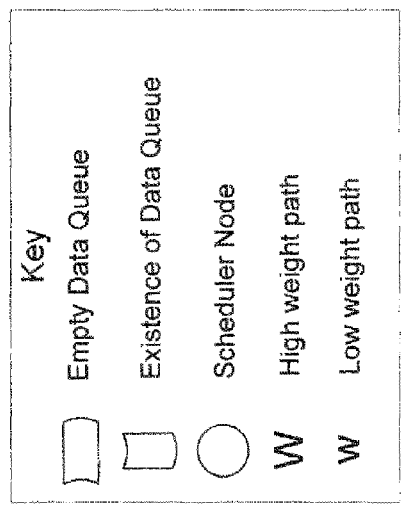

Referring now to FIG. 2, an exemplary scheduler 18 constructed in accordance with the principles of the present invention includes a plurality of scheduling nodes 20a, 20b, 20c, 20d (referred to collectively as scheduling node 20) arranged in a scheduling hierarchy. FIG. 2 shows the scheduler 18 as operating according to a weight fair queuing ("WFQ") scheduling scheme for illustrative purposes only. The principles of the present invention may be equally applied to other schemes for scheduling, e.g., earliest deadline first, priority queuing, etc.

The root node 20d, in exemplary FIG. 2, is the parent node for child nodes 20a and 20b. The bandwidth allotted by the scheduler for servicing scheduling node 20a and node 20b is split proportionally according to weight values for each branch. Scheduling node 20a has a weight value of "W" and scheduling node 20b has a weight value of "w". The value of W is higher than the value of w. For example, if W=0.75 and w=0.25, parent scheduler 20d would dequeue data from scheduling node 20a three times as often as it would pull data from scheduling node 20b. Likewise, scheduling node 20a is the parent of child node 20c.

Each scheduling node 20 has a corresponding existence of data ("EoD") queue 24a, 24b, 24c, 24d (referenced collectively as EoD queue 24). A queue or list is the most common scalable implementation of this type of structure, but on less scalable parts of a system, the EoD structures could also be vectors, sets of queues or any other storage mechanism. The EoD queue 24 contains a listing of children and data queues eligible for dequeuing, but not currently known to the scheduler node 20. Here, not known to the scheduler refers to the child not currently participating in the scheduling process within the scheduler context structure and therefore not yet receiving the treatment that will ensure fairness according to its configured priority, rates and weights. The EoD queues 24 contain information known to increase the amount of data available to the scheduling node 20. EoD queues 24 may also include allowances for sorting by latency sensitivity or importance, e.g. a high priority EoD queue and a low priority EoD queue. More than one queue in the EoD structure helps with the overall fairness during the period of time when many events are being absorbed through this mechanism. For example, it is more prudent for the scheduler to discover an extremely high weight branch of the scheduling hierarchy than a low weight branch as intended fairness is best met by scheduling the high weight branch many times per scheduling of the low weight branch.

Each scheduling node 20 may service a plurality of data queues in addition to other child scheduling nodes. For example, scheduling node 20a services data queues 26 and 28 in addition to child scheduling node 20c. Thus, the bandwidth allotted to scheduling node 20a is divided proportionally among data queues 26, 28 and child scheduling node 20c. Likewise, scheduling node 20c services data queues 30 and 32, and scheduling node 20b services data queues 34 and 36. The exemplary scheduler 18 may contain thousands or even millions of scheduling nodes 20 and data queues 26, 28, 30, 32, 34, 36. However, to allow the processes of the present invention to be expressed in a simple, illustrative manner, only four nodes 20 and six data queues 26, 28, 30, 32, 34, 36 are shown in FIG. 2.

Figure 3:
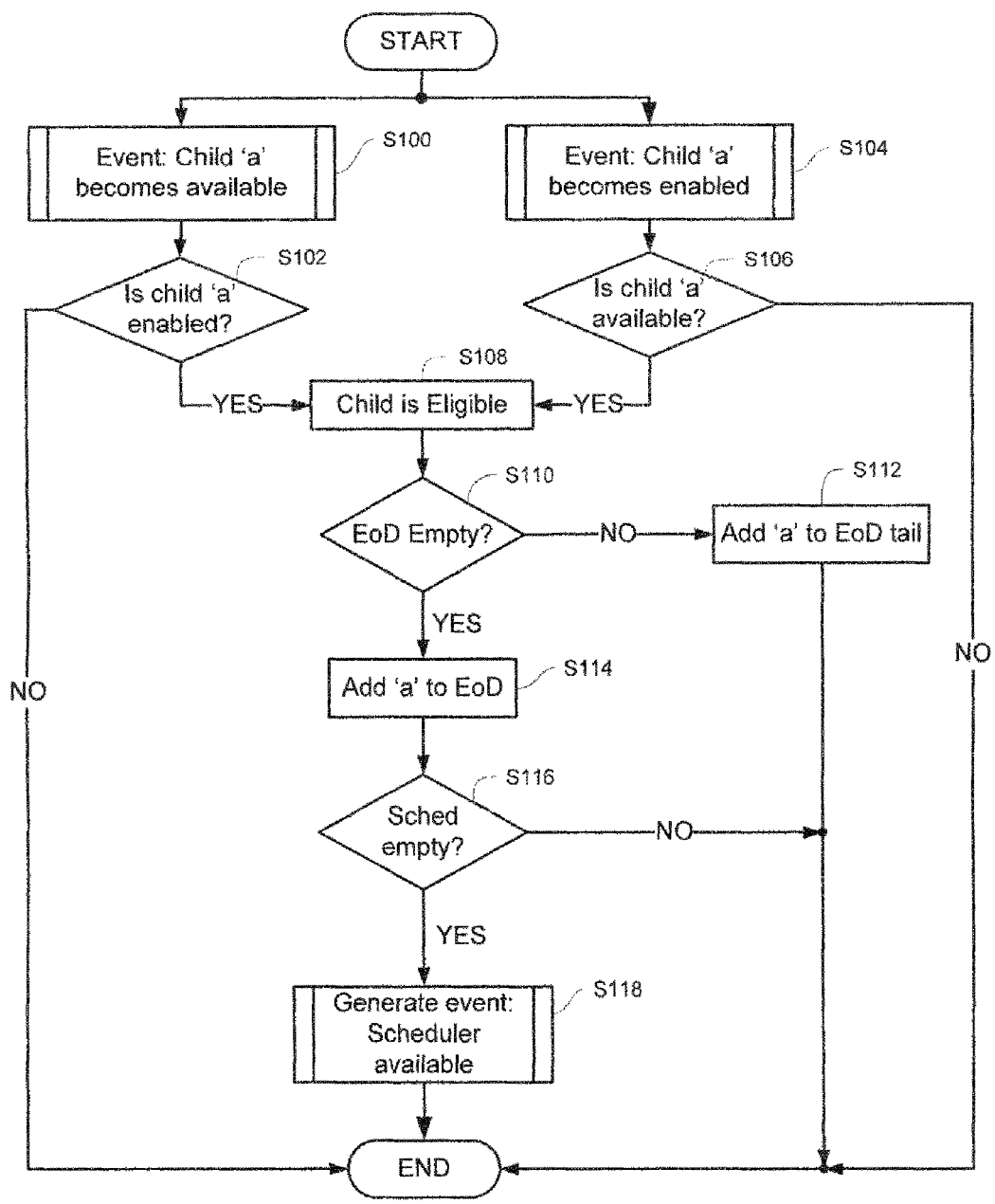
FIG. 3 a flowchart of an exemplary child eligibility updating process according to the principles of the present invention.

Referring to FIG. 3, an exemplary operational flowchart is provided that describes steps performed by an eligibility updater process as a result of new data becoming available for scheduling, e.g., enqueue to an empty data queue, or an intervening process enabling a child for scheduling which was previously disabled, e.g. the removal of a rate restriction due to passage of time. The FIG. 3 process starts with a change of state. In step S100, the change of state is triggered by a child node transitioning to data available (which itself could have been triggered by any of a number of events including a data enqueue to a child queue). In this case, step S102 ensures that the child is currently in the enabled state (which could have been previously withdrawn by an intervening process). In step S104, the change of state is triggered by an intervening process enabling the child. In this case, step S106 ensures that the child which is now enabled actually has data available (previous enqueue to a child queue). In both of these cases S100 and S104, if both the child is enabled and has data available the flow chart will arrive at the decision that the child is eligible (step S108). The eligibility updater process updates the eligibility of the scheduling node to its parent node. The eligibility updater process determines whether the scheduling node's EoD queue is currently empty (step S110).

If the EoD queue is not empty, child "a" is simply added to the tail of the EoD queue (step S112) and no further action needs to be taken as the state of the scheduling node is already eligible. However, if the EoD queue is empty, the eligibility updater adds the eligible child "a" to the EoD queue (step S114) and determines the current scheduling state, i.e., eligible data in the scheduling context structure, of the scheduling node (step S116). If the scheduling node already contains eligible children in its context, no further action needs to be taken. If the scheduling context structure of the scheduling node is empty, then a message may need to be sent to an ancestor indicating the newly available data. A message is sent to the process which requests bandwidth of the scheduler to notify it that data is available for scheduling (step S118).

There are many possible reasons why an intervening process would not enable a scheduling node; however, the most interesting reason for the purposes of the current invention is that a monitoring algorithm has determined that the scheduling node is receiving too much bandwidth and therefore must be disabled for a period of time. The act of re-enabling these not enabled scheduling nodes is a significant source of bursts of out-of-date state which need to reside in the EoD structures until absorbed into scheduler context structures.

Figure 4:
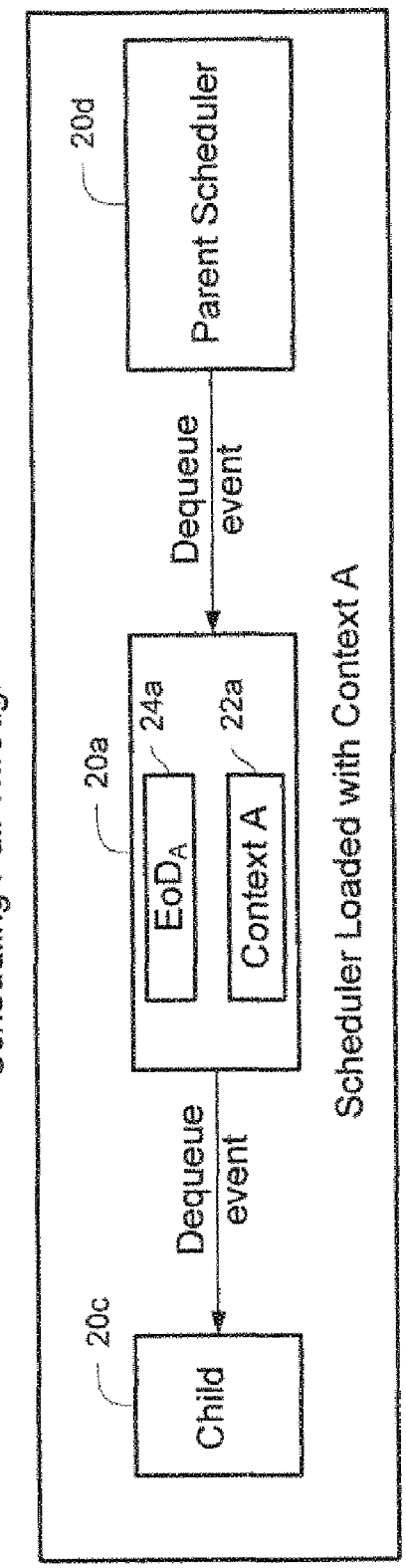
FIG. 4 is a block diagram of an exemplary dequeuing event according to the principles of the present invention.

Referring now to FIG. 4, a block diagram is shown which illustrates an exemplary representation of a dequeuing event in a hierarchical scheduler. A scheduler first loads the context for a high level scheduling node such as 20d; which uses its scheduling process to select a child of 20d for dequeue such as 20a; and scheduler 20a in turn uses its scheduling process to select a child of 20a for dequeue such as scheduling node 20c. As part of the scheduling process after being selected by its parent 22a, scheduling node "A" 20a loads context A which contains scheduling context structure "Context A" 22a and an EoD queue 24a denoted as $EoD_A$. The scheduling context structure 22a is the state required within the specific scheduling algorithm employed to provide fairness between children. For example, a queue or a set of queues containing child identifiers is a typical scheduling context structure, used for algorithms derived from round robin scheduling. The scheduling node 20a selects an eligible child from the scheduling context structure 22a or, if the scheduling context structure 22a is empty, from the $EoD_A$ queue 24a. The scheduling node 20 either dequeues data from the selected child (if the child were a queue), or as is the case in FIG. 4, sends a dequeuing event to the selected child node 20c. This process is repeated each time data is required by the parent scheduler 20d. In addition to meeting the immediate need to select a child, the current invention also absorbs one or preferably more additional children from the $EOD_A$ while the context A is cached in the scheduler process.

Figure 5:
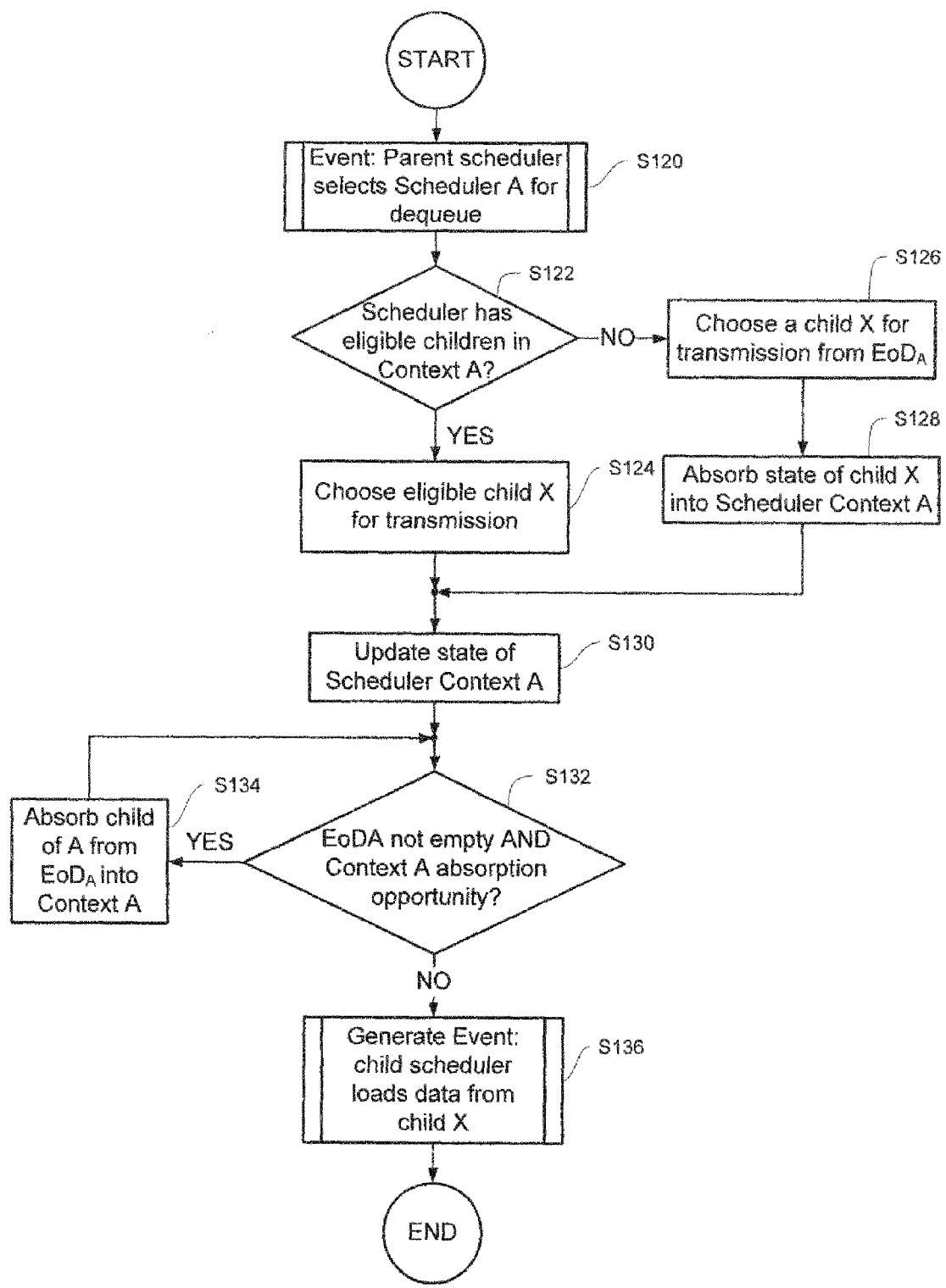
FIG. 5 is a flowchart of an exemplary dequeuing process according to the principles of the present invention.

Referring to FIG. 5, an exemplary operational flowchart is provided that describes steps performed by a scheduler 18 when dequeuing data from a scheduling node 20. The flow chart can apply to one or more scheduler nodes 20. A parent scheduler selects a scheduling node, e.g., Scheduler "A", for dequeuing (step S120). If the scheduling node has eligible children in its scheduling context structure (step S122), then a child "X" is chosen from the scheduling context structure for transmission, i.e., dequeuing (step S124). If the scheduler has no eligible children in its scheduling context structure (step S122), then a child "X" is chosen for transmission from the $EoD_A$ queue (step S126) and the state of child "X" is absorbed into scheduler context "A" (step S128). The state of scheduler context "A" is updated to reflect that data from child "X" has been dequeued (step S130). If the $EoD_A$ queue contains any more eligible children and scheduler context "A" has additional absorption opportunities (step S132), the state of one or more eligible children in the $EoD_A$ queue are absorbed into scheduler context "A" (step S134). Ideally, as many of the out-of-date children in the $EoD_A$ structure as possible are absorbed for the active scheduler node because in an exemplary implementation with caching of scheduler state it is less expensive to absorb state for the active scheduler node than for an inactive scheduling node. The child scheduler loads the data from child X for dequeuing (step S136). The parent scheduler repeats the above process for each scheduling node 20 in the hierarchy selected for dequeuing.

It should be noted that a scheduling node may absorb into its scheduler state one or more children from the EoD queue per servicing cycle, independent of whether the scheduler has actually chosen a child from the EoD queue. Generally, while a child is waiting in an Existence of Data structure, it is likely not receiving fair treatment compared to peers which are already in the scheduler's state. Allowing more than one child to be absorbed from the Existence of Data structure for every child scheduled certainly helps in this regard.

Figure 6:
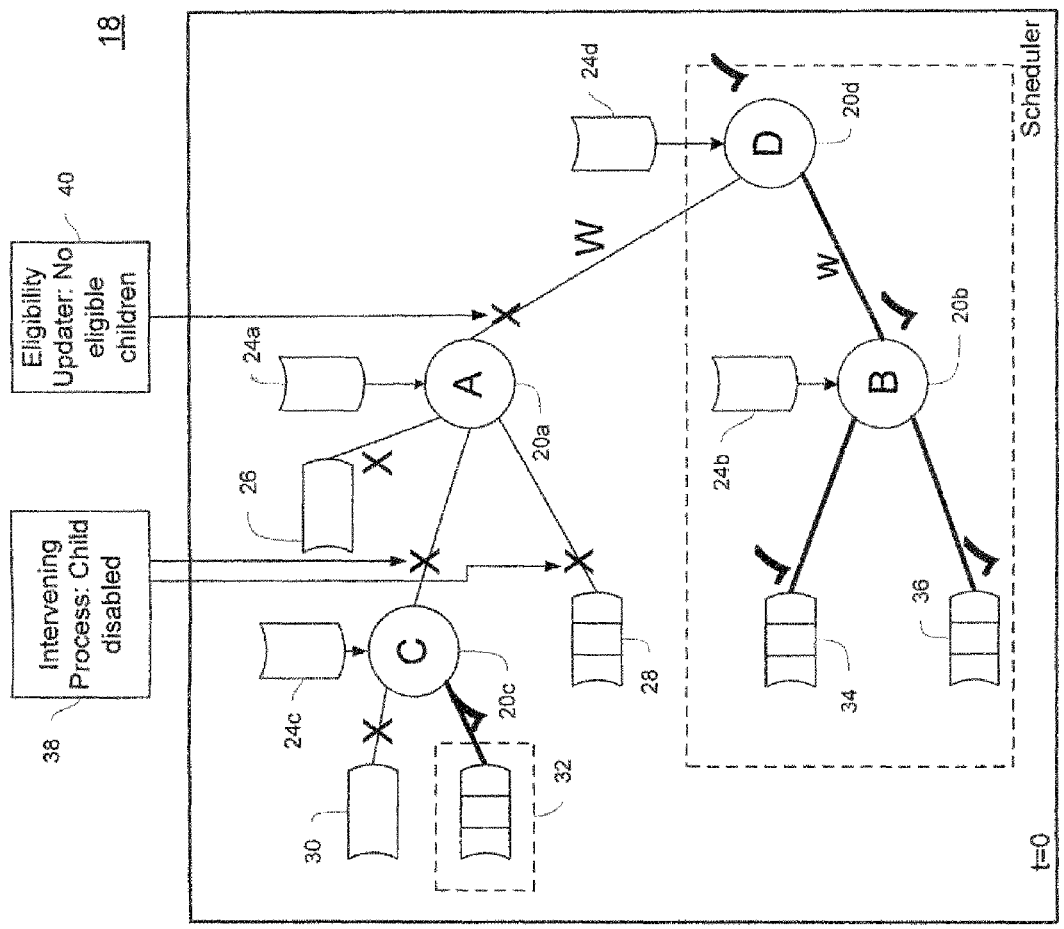
FIG. 6 is a block diagram of an exemplary scheduler showing state conditions at an initial time, constructed in accordance with the principles of the present invention.
Figure 6:
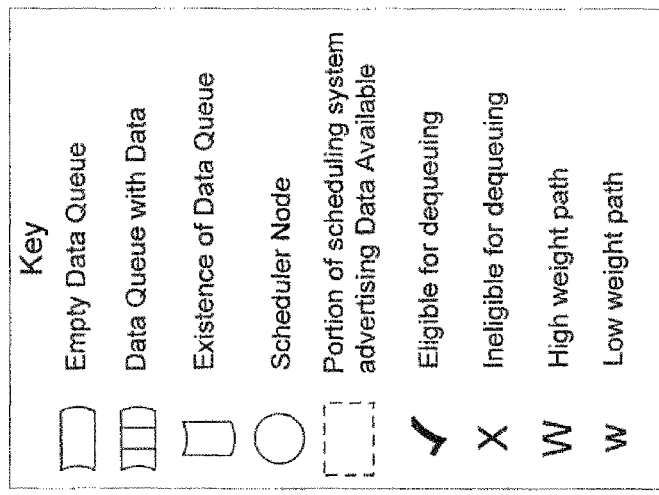
Figure 7:
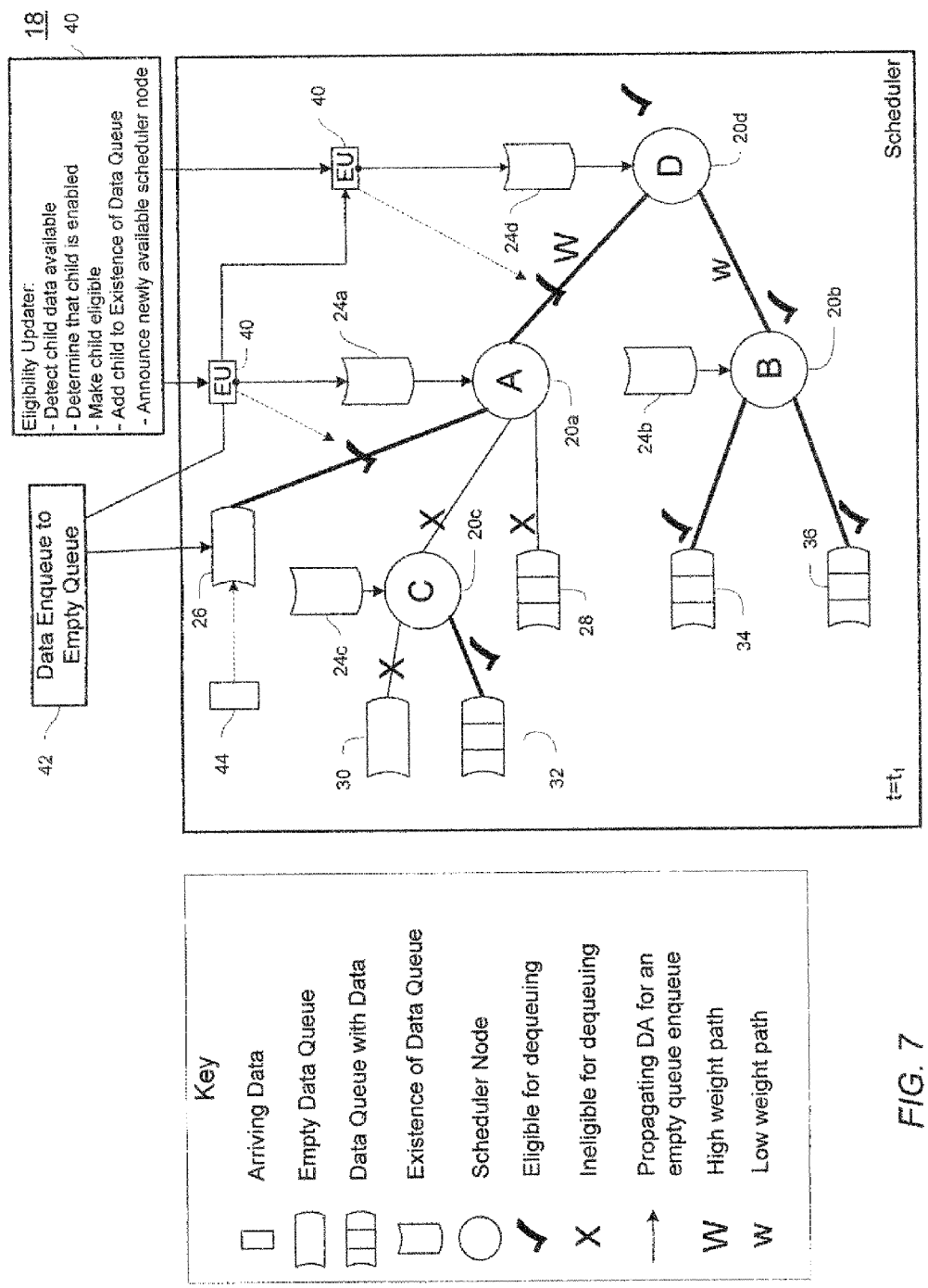
FIG. 7 is a block diagram of an exemplary scheduler showing state conditions after the passage of an interval of time, constructed in accordance with the principles of the present invention.

Referring now to FIGS. 6 and 7, an exemplary dequeuing process, performed in accordance with the principles of the present invention is shown. FIG. 6 contains a block diagram similar to the block diagram of the exemplary scheduler 18 of FIG. 2, indicating the status and eligibility of data queues and scheduling nodes 20 at an initial time, t=0. FIG. 7 contains a block diagram of the same exemplary scheduler 18 after an empty data queue receives a data enqueue, at some later time interval $t=t_1$.

In FIG. 6, data queues 26 and 30 are currently empty, thus neither is currently eligible for dequeuing. Data queue 28 currently contains data, but has been determined to be disabled by intervening process 38, thus data queue 28 is ineligible for dequeuing. An intervening process 38 determines whether a particular child or data queue is enabled or disabled based on a number of circumstances including, for example, whether the child is meeting predetermined rate parameters. Likewise, data queue 32 contains available data and is currently advertising that it is eligible for dequeuing; however, scheduling node 20c has been determined to be disabled by the intervening process 38, thus 20c is not eligible. Scheduling node 20c may not yet know that data queue 32 is eligible, in which case data queue 32 will be listed in EoD 24c. An eligibility updater process 40 is aware that scheduling node 20a contains no eligible children for dequeuing, thus scheduling node 20a is also ineligible for dequeuing. In this example, an intervening process 38 could also have an opinion on whether scheduler node 20a is enabled, but having no data ensures that 20a is not eligible.

Data queues 34 and 36 contain available data and are currently eligible for dequeuing. Scheduling node 20b knows of the eligible children in its context, thus scheduling node 20b is advertising that it is eligible for dequeuing. Even though the weighting value W is greater for scheduling node 20a than the weighting value w for scheduling node 20b, because scheduling node 20a is ineligible, parent scheduler 20d will only select for dequeue from scheduling node 20b until node 20a becomes eligible.

FIG. 7 illustrates changes of state of the scheduler shown in FIG. 6 after some time interval ($t=t_1$) has passed where data queue 26 is now receiving a data enqueue event 42 to an empty queue, i.e., data queue 26 has received data 44 which is available for dequeuing. The data enqueue to an empty queue event 42 leads to a series of events which propagate the existence of data 44. Note it is assumed that an intervening process 38 has not disabled scheduling node 20a and therefore a presence of data at a child of node 20a could make node 20a eligible for scheduling by node 20d. Starting with the queue, the enqueue to empty queue event 42 triggers a message to the scheduling node 20*a* that queue 26 has data available to transmit. The eligibility updater process 40 associated with scheduler 20*a* determines that queue 26 is not disabled and therefore enqueues the message from queue 26 into the EoD queue 24*a* for scheduler node 20*a*. Without waiting for the data queue 26 message to make its way through EoD queue 24*a*, a message is forwarded to the parent of node 20*a* indicating that scheduler node 20*a* has data available. The eligibility updater process 40 associated with scheduler 20*d* ensures that an intervening process has not disabled node 20*a* and then forwards the message into EoD queue 24*d*. The propagation stops at this point because scheduler 20*d* is already available. Thus, when any parent scheduler 20*d*, 20*a* of data queue 26 is selected for dequeuing, data queue 26 may be selected from the parent scheduler's EoD queue 24, even if data queue 26 has not yet been absorbed into the parent scheduler's scheduling context structure 22. After the enqueue event 42, scheduling node 20*a* will advertise the existence of data and be treated as an equal peer to scheduling node 20*b* within scheduling node 20*d*.

The present invention provides a number of benefits. In one aspect, the present invention advantageously allows child changes of state to be managed at each level of the hierarchy, somewhat independently. Occasionally, a child entering the EoD queue could be the first eligible child arriving to a node (either in scheduler context or EoD structures) and therefore requires propagation to the parent, but the propagation is not time critical and it does not matter if a parent of a newly eligible scheduler node absorbs the newly eligible scheduler node before the newly eligible scheduler node absorbs its newly eligible child.

Also, a scheduler can choose a child to schedule whose current scheduling state implies there is no data to transmit. The scheduler who becomes selected but has no children in its scheduler context structure 22 (i.e. Round Robin SCQ) can select a child from its EoD system.

Additionally, when a scheduling action (i.e. selecting a child for transmission) loads a scheduler circuit or processor with context, this particular scheduler is in a very good position to absorb some extra EoD children into the scheduler context. Absorbing extra EoD children in the branch of the scheduler hierarchy which the scheduler has chosen is generally a strong behavior because the scheduler is guiding which out-of-date scheduler context should be updated first. Previous implementations of child state change absorption were either random or first come, first served, but were not pulled through by scheduler decisions because the scheduler is unaware of the existence of data until after the absorption of state changes is complete.

The present invention allows an O(1) scheduler to dominate the overall scheduling behaviors. The configured scheduler weights, rates, and hierarchy have a strong correlation to which backlogged updates are absorbed into the scheduler. In effect, the O(1) scheduler pulls through a portion of the scheduler updates from the intervening processes. For example, if schedulers A and B have the same parent scheduler and scheduler A has 10 times higher scheduling weight than scheduler B, the present solution will allow scheduler A to absorb 10 times as many child updates as scheduler B from the EoD queues. This is desirable behavior because in the same period of time, scheduler A will be selecting 10 times as many children to dequeue from as compared to scheduler B.

In many O(1) scheduler implementations, such as Weighted Round Robin, as an example, a scheduler or a queue competes for fair share of bandwidth whenever data is available. An aspect of the current invention is that the scheduler or queue state does not actually have to indicate data available, as long as there is a reliable mechanism for EoD. EoD acts like the thin edge of the wedge that enables a scheduler or queue to start fighting for bandwidth. Once a single scheduling event can follow a branch of the scheduling hierarchy (the EoD structure containing data provided this thin edge of the wedge by propagating eligibility), then more children identifiers can be absorbed into the scheduler context structure and allow the scheduler to make many more decisions down the same branch of the scheduling hierarchy if warranted (the thick end of the wedge). If the scheduler or queue has strong weights and rates with its parent scheduler, the parent scheduler will choose the queue or scheduler early and often, which allows the pull through of state information for that queue or scheduler. For example, consider FIG. 7 if scheduling node 20*c* and data queue 28 become eligible (enabled by an intervening process 38) simultaneously to data queue 26 receiving data 44 such that the eligibility updater 40 for scheduler node 20*a* adds node 20*c* and queue 28 to EoD 24*a* immediately following queue 26. During the selection of queue 26 the first time, if scheduler node 20*a* is able to absorb 20*c* and 28 into its scheduler context structure 22, then node 20*d* will have at least two future opportunities to select high weight child 20*a* over low weight child 20*b*. In the meantime, the decisions made by scheduling node 20*a* will be increasingly fairer as more children are active in the scheduler context structure 22.

For schedulers or queues which are not strongly weighted, the bandwidth provided by the parent scheduler will still be fair but will not accelerate the pull through of child state because the child's state is not as critical to the decisions of the scheduler. Any additional bandwidth the schedulers have to absorb child state change events could be used to accelerate the emptying of these structures and restore full fairness, but this is not time critical. Ideally this means a highly efficient (preferably work conserving) subservient task which can find and process backlogged EoD structures which are outside the context of the current scheduler decisions.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for scheduling data for dequeuing in a communication network having a hierarchy of interacting scheduling nodes including a child scheduling node and parent scheduling node, the child scheduling node being an eligible scheduling node, the eligible scheduling node having a scheduling context structure, an existence of data structure, and a data queue associated therewith, the method comprising:

responsive to determining that the eligible scheduling node does not contain at least one child identifier in the scheduling context structure and that an eligible child exists in the existence of data structure:

forwarding a message from the eligible scheduling node to the parent scheduling node, the message indicating the existence of an eligible child in the existence of data structure; and and after forwarding the message, absorbing at least one eligible child from the existence of data structure into the scheduling context structure, absorbing the at least one eligible child including:

removing the child identifier from the existence of data structure; and adding the child identifier to the scheduling context structure.

2. The method of claim 1, further comprising:

responsive to determining that the eligible scheduling node contains at least one child identifier in the scheduling context structure:

selecting for dequeuing an eligible child from the scheduling context structure.

3. The method of claim 2, further responsive to determining that the eligible scheduling node contains at least one child identifier in the scheduling context structure:

determining whether the eligible scheduling node contains at least one child identifier in the existence of data structure; and responsive to determining that the eligible scheduling node contains at least one child identifier in the existence of data structure:

absorbing at least one eligible child from the existence of data structure into the scheduling context structure.

4. A method for scheduling data for dequeuing in a communication network having a hierarchy of interacting scheduling nodes including a child scheduling node and a parent scheduling node, the method comprising:

determining that one of the child scheduling node and a data queue is eligible for dequeuing;

setting an eligibility state for the one of the child scheduling node and the data queue to eligible;

determining whether an existence of data structure of the parent scheduling node for the one of the child scheduling node and the data queue is empty; and responsive to determining that the existence of data structure of the parent scheduling node for the one of the child scheduling node and the data queue is not empty, adding an identifier for the one of the child scheduling node and a data queue to the existence of data structure of the parent scheduling node.

5. The method of claim 4, further comprising:

responsive to determining that the existence of data structure of the parent scheduling node for the one of the child scheduling node and the data queue is empty:

adding an identifier for the one of the child scheduling node and the data queue to the existence of data structure of the parent scheduling node;

determining an eligibility state of the parent scheduling node before and after adding the child identifier, wherein the eligibility state is eligible when:

a child identifier is present in at least one of the existence of data structure of the parent scheduling node and a scheduling context structure of the parent scheduling node; and the parent scheduling node is otherwise enabled for dequeuing; and responsive to determining that the eligibility state of the parent scheduling node has changed from ineligible to eligible for dequeuing, setting the eligibility state for the parent scheduling node to eligible.

6. The method of claim 5, further comprising:

responsive to setting the eligibility state of the parent scheduling node to eligible:

determining whether the eligible parent scheduling node has at least one ancestor scheduling node; and responsive to determining that the eligible parent scheduling node has at least one ancestor scheduling node:

adding an identifier for the eligible parent scheduling node to an existence of data structure for each ancestor scheduling node of the at least one ancestor scheduling nodes; and evaluating and propagating an eligibility state for each ancestor scheduling node of the at least one ancestor scheduling nodes.

7. The method of claim 5, further comprising responsive to a request to the eligible parent scheduling node for data dequeue, selecting an eligible child for data dequeuing.

8. The method of claim 7, further comprising:

determining whether the eligible parent scheduling node contains at least one child identifier in the scheduling context structure of the eligible parent scheduling node; and responsive to determining that the eligible parent scheduling node does not contain at least one child identifier in the scheduling context structure of the eligible parent scheduling node:

selecting for dequeue one of a child node and a data queue with an identifier in the existence of data structure of the eligible parent scheduling node; and absorbing a child identifier for at least one of an eligible child node and an eligible data queue from the existence of data structure of the eligible parent scheduling node into the scheduling context structure of the eligible parent scheduling node, wherein the at least one of an eligible child node and an eligible data queue includes the one of a child node and a data queue selected for dequeue, and wherein absorbing includes:

removing the child identifier for the at least one of an eligible child node and an eligible data queue from the existence of data structure of the eligible parent scheduling node; and adding at least one corresponding child identifier to the scheduling context structure.

9. The method of claim 7, further comprising:

determining whether the eligible parent scheduling node contains at least one child identifier in the scheduling context structure; and responsive to determining that the eligible parent scheduling node contains at least one child identifier in the scheduling context structure of the eligible parent scheduling node:

selecting for dequeuing an eligible child from the scheduling context structure of the eligible parent scheduling node.

10. The method of claim 9, further responsive to determining that the eligible parent scheduling node contains at least one child identifier in the scheduling context structure of the eligible parent scheduling node:
determining whether the eligible parent scheduling node contains at least one child identifier in the existence of data structure of the eligible parent scheduling node; and
responsive to determining that the eligible parent scheduling node contains at least one child identifier in the existence of data structure of the eligible parent scheduling node:
absorbing the child identifier for at least one eligible child from the existence of data structure of the eligible parent scheduling node into the scheduling context structure of the eligible parent scheduling node.

11. A system for scheduling data for dequeuing in a communication network having a hierarchy of interacting scheduling nodes including a child scheduling node and a parent scheduling node, the system comprising:
at least one data queue containing data for dequeuing;
at least one child communicatively coupled to the at least one data queue, the at least one child being one of a data queue and a child scheduling node;
at least one parent scheduling node communicatively coupled to the at least one child, the at least one parent scheduling node including:
a scheduling context structure; and
an existence of data structure; and
an eligibility updater communicatively coupled to the at least one data queue, the at least one child, and the at least one parent scheduling node, the eligibility updater operable to:
determine an eligibility state for a child;
responsive to determining that the eligibility state is eligible, set an eligibility state for the child to eligible; and
responsive to determining that the existence of data structure of the parent scheduling node is not empty, appending an identifier for the eligible child to the existence of data structure.

12. The system of claim 11, wherein responsive to determining that the existence of data structure of a parent scheduling node of the child is empty, the eligibility updater is further operable to:
add an identifier for the eligible child to the existence of data structure of the parent scheduling node;
determine an eligibility state for the parent scheduling node; and
responsive to determining that the parent scheduling node is eligible, set an eligibility state for the parent scheduling node to eligible.

13. The system of claim 11, further comprising:
at least one ancestor scheduling node communicatively coupled to the at least one parent scheduling node and the eligibility updater; and
wherein the eligibility updater is further operable to:
add an identifier for the at least one parent scheduling node to an existence of data structure for the at least one ancestor scheduling node;
determine an eligibility state for the at least one ancestor scheduling node; and
responsive to determining that the at least one ancestor scheduling node is eligible, set an eligibility state for the at least one ancestor scheduling node to eligible.

14. The system of claim 11, wherein the at least one parent scheduling node upon selection by its ancestor is operable to:
select an eligible child from the at least one child for dequeuing.

15. The system of claim 14, wherein the at least one parent scheduling node is further operable to:
determine whether the scheduling context structure contains at least one child identifier; and
responsive to determining that the scheduling context structure does not contain at least one child identifier:
select for dequeuing an eligible child from the existence of data structure;
absorb at least one eligible child from the existence of data structure into the scheduling context structure, wherein the at least one eligible child includes the child node selected for dequeuing, and wherein absorb includes:
removing the at least one child identifier for the at least one eligible child from the existence of data structure; and
adding the at least one child identifier to the scheduler context structure.

16. The system of claim 14, wherein the at least one parent scheduling node is further operable to:
determine whether the scheduling context structure contains at least one child identifier; and
responsive to determining that the scheduling context structure contains at least one child identifier:
select an eligible child node from the scheduling context structure for dequeuing;
determine whether the existence of data structure contains at least one child identifier for at least one eligible child; and
responsive to determining that the existence of data structure contains at least one child identifier for at least one eligible child:
absorb at least one child of the at least one eligible child from the existence of data structure into the scheduling context structure.

17. The system of claim 14, wherein:
the scheduling context structure stores data for child nodes and data queues that the at least one parent scheduling node knows to be eligible for dequeuing; and
the existence of data structure stores data for child nodes and data queues not currently known to the at least one parent scheduling node.

* * * * *